(12) United States Patent
Sasaki et al.

(10) Patent No.: US 7,903,195 B2
(45) Date of Patent: Mar. 8, 2011

(54) LCD PANEL HAVING A BLACK COLORING LAYER AND AN ANTI-GLARE LAYER ATTACHED TO A PROTECTION PLATE THROUGH AN ADHESION LAYER IN WHICH THE BLACK COLORING LAYER AND THE ADHESION LAYER HAVE A PREDETERMINED RELATED THICKNESS

(75) Inventors: Hiroshi Sasaki, Mito (JP); Makiko Sugibayashi, Chiba (JP); Yasushi Tomioka, Hitachinaka (JP); Katsumi Kondo, Mito (JP)

(73) Assignee: Hitachi Displays, Ltd., Chiba-Ken (JP)

( * ) Notice: Subject to any disclaimer, the term of this patent is extended or adjusted under 35 U.S.C. 154(b) by 228 days.

(21) Appl. No.: 12/192,152

(22) Filed: Aug. 15, 2008

(65) Prior Publication Data

US 2009/0086120 A1 Apr. 2, 2009

(30) Foreign Application Priority Data

Sep. 28, 2007 (JP) ................................ 2007-252969

(51) Int. Cl.
  *G02F 1/1335* (2006.01)
(52) U.S. Cl. ................. 349/62; 349/58; 349/64; 349/110
(58) Field of Classification Search .............. 349/58–60, 349/62–65
See application file for complete search history.

(56) References Cited

U.S. PATENT DOCUMENTS

| 2002/0154254 A1* | 10/2002 | Tasaki et al. ................ 349/58 |
| 2007/0002211 A1 | 1/2007 | Sasaki et al. |
| 2007/0109650 A1 | 5/2007 | Yamada et al. |

FOREIGN PATENT DOCUMENTS

| JP | 11-174417 | 7/1999 |
| JP | 2000-340985 | 12/2000 |
| JP | 2007-041534 | 2/2007 |
| JP | 2007-164154 | 6/2007 |

OTHER PUBLICATIONS

U.S. Appl. No. 11/965,940, filed Dec. 28, 2007, Sugibayashi et al.

\* cited by examiner

*Primary Examiner* — John Heyman
(74) *Attorney, Agent, or Firm* — Antonelli, Terry, Stout & Kraus, LLP.

(57) ABSTRACT

An object of the present invention is to propose the structure and constitution of a liquid crystal display device having a protection plate, which prevents exfoliation of black painting at ends of the protection plate when dust on the protection plate of the liquid crystal display device is wiped off, thus preventing degradation of design features.

The liquid crystal display device comprises: a transparent protection plate formed above a liquid crystal panel; a pair of polarizing plates disposed to sandwich and hold the liquid crystal panel; a transparent organic medium layer formed between the protection plate and the liquid crystal panel; a black coloring layer formed at ends of four sides on a side of the protection plate, the side being opposite to a side at which the transparent organic medium layer is disposed; and an anti-glare film composed of an anti-glare layer and an adhesion layer formed on a side of the protection plate, the side being opposite to a side at which the transparent organic medium layer is disposed.

16 Claims, 5 Drawing Sheets

FIG. 4(1)
WHEN 2t≧T

FIG. 4(2)
WHEN 2t<T

AFTER A FEW MINUTES

FIG. 7(1)
WHEN 2t≧D

FIG. 7(2)
WHEN 2t<D

FIG. 7(3)
WHEN 2t<D (ENLARGED VIEW)

WHEN ADHESION LAYER IS FLAT

FIG. 9(2)

WHEN ADHESION LAYER IS THICKER AT A PORTION CLOSER TO CENTER OF LIQUID CRYSTAL PANEL

LCD PANEL HAVING A BLACK COLORING LAYER AND AN ANTI-GLARE LAYER ATTACHED TO A PROTECTION PLATE THROUGH AN ADHESION LAYER IN WHICH THE BLACK COLORING LAYER AND THE ADHESION LAYER HAVE A PREDETERMINED RELATED THICKNESS

BACKGROUND OF THE INVENTION

1. Field of the Invention

The present invention relates to a liquid crystal display device which includes a liquid crystal layer between a pair of substrates.

2. Description of the Related Art

With a liquid crystal display device using liquid crystal, light from light sources passes through a liquid crystal layer, a color filter, a polarizing plate, etc. before an image is recognized. In this case, a polarizing plate is provided at the outermost surface of a liquid crystal display device for a personal computer monitor or a liquid crystal television. To restrain surface reflection, an anti-glare (AG) film having fine irregularities or an antireflection film is provided on the surface of the polarizing plate. There is a liquid crystal panel made of a glass plate having a thickness of about 0.5 to 0.7 mm under the polarizing plate.

The glass plate under the polarizing plate for such a personal computer monitor and a liquid crystal television has a thickness of 0.5 to 0.7 mm depending on products. Therefore, the glass plate may be broken if tableware, a flower vase, a toy, or the like collides with it with large impact. There is a trend toward increasing the screen size of both a personal computer monitor and a liquid crystal television. The larger the screen size with a fixed glass plate thickness, the smaller becomes the resistance to shock and therefore the glass plate is susceptible to breakage even with very small impact. Accordingly, it is contemplated to improve the resistance to shock by providing a transparent substrate (hereafter referred to as protection plate) at the outermost surface as is the case with a cellular phone.

However, since there is a gap between the glass plate and the polarizing plate, a severe reflection of surrounding scenery to the image display plane takes place on three surfaces: both surfaces of the protection plate and the surface of the polarizing plate. This arises a problem of degraded visibility in a well-lighted area.

JP-A-11-174417 discloses a technique in which the gap between the protection plate and the polarizing plate is filled with a transparent organic medium and thereby reflection on the polarizing plate and on the polarizing plate side of the protection plate is restrained.

However, when this transparent organic medium is formed, the problem is that air bubbles enter between the protection plate and the liquid crystal panel. For example, if the protection plate is larger than the liquid crystal panel, the end frame which is a non-pixel region of the liquid crystal panel and air bubbles at the end will be watched disadvantageously.

Therefore, it is contemplated to form a black-painted portion at ends of four sides on the protection plate to hide the frame and air bubbles. The same measure is performed also for the glass plate used for a front filter of the PDP. When this measure (black painting) is performed with an inorganic material, it is normally referred to as black ceramic (refer to JP-A-2000-340985). However, since it is necessary to perform hardening at high temperature, in many cases, a black-painted portion is formed using a paint in which black coloring matters are distributed and dissolved. The glass plate of the front filter of the PDP is preliminarily subjected to black painting. Therefore, even if the surface is wiped a number of times to remove dust and dust thereon, the black-painted portion will not exfoliate. Further, the front surface is formed under the glass plate having a higher flatness and the black-painted portion also has a higher flatness in the visible surface direction. The surface of the pixel region is also a glass plate having a higher flatness, providing a sense of integration of the black-painted portion and the pixel region as well as excellent design features.

SUMMARY OF THE INVENTION

Meanwhile, when the housing and the protection plate of a liquid crystal television are combined, the back side of the protection plate will be fixed to the housing because fixing the liquid crystal panel to the housing may cause fluctuations of the gap distance of the liquid crystal layer.

However, if black painting is made on the back side of the protection plate, the fixing portion of the protection plate and the housing becomes a black-painted portion. If they are fixed by adhesion, the black-painted portion may exfoliate. Even a 32-inch liquid crystal display device including the protection plate, the transparent organic medium, and the liquid crystal panel weighs several kilograms. Therefore, if the protection plate is attached to the painted surface, the attached surface may exfoliate together with the paint due to the weight. Even if a certain coupler is provided instead of an adhesion portion, an adhesion portion is required on the black-painted portion, and there is a risk that the black-painted portion exfoliates.

Further, if a precursor of the transparent organic medium is a photo-setting liquid, the light required for hardening is interrupted by the black-painted portion and the portion below the black-painted portion is not hardened. As a result, there is a risk that an unhardened object leaks from the frame.

Further, if a black-painted portion is formed using a paint in which black coloring matters are distributed and dissolved, black painting may cause swelling, dissolution, or the like due to the precursor of the transparent organic medium.

If a black-painted portion is formed on the front surface, painting is possible after a transparent organic medium layer is formed. Therefore, it is possible to resolve the problem of disturbed photo setting and the problem of black-painted portion exfoliated by the adhesion between the television housing and the protection plate. Since there is a black-painted portion on the surface, however, if the surface is wiped a number of times to remove dust and dust, the black-painted portion may exfoliate. Further, the color of the black-painted portion is matte-black because of a poor flatness. Therefore, the black-painted portion differs in reflecting state from the pixel region whose flat glass plate is formed on a surface, which eliminates the sense of integration of the black-painted portion and the pixel region and leads to degraded design features.

An object of the present invention is to provide a liquid crystal display device in which exfoliation of the black-painted portion is restrained and design features do not degrade.

In view of the above-mentioned problems, a liquid crystal display device according to the present invention comprises: A liquid crystal display device comprising: a liquid crystal panel which includes a liquid crystal layer sandwiched and held between a pair of substrates; a pair of polarizing plates disposed to sandwich and hold the liquid crystal panel; a transparent organic medium layer formed on a side of one of the pair of polarizing plates, the side being opposite to a side at which the liquid crystal panel is disposed; a protection plate formed on a side of the transparent organic medium layer, the side being opposite to a side at which the liquid crystal panel is disposed; and a black coloring layer formed on a side of the protection plate but in a non-image display region, the side being opposite to a side at which the transparent organic medium layer is disposed.

The liquid crystal display device further comprises: a backlight which includes light sources disposed for the liquid crystal panel at a side opposite to the side at which the protection plate is disposed, the light sources irradiating the liquid crystal panel with light.

Further, the black coloring layer is formed at ends of four sides on the protection plate.

The liquid crystal display device further comprises: an anti-glare layer or an antireflection layer formed on a side of the protection plate, the side being opposite to a side at which the transparent organic medium layer is disposed.

The present invention makes it possible to provide a liquid crystal display device capable of restraining exfoliation of the black-painted portion without degrading design features.

BRIEF DESCRIPTION OF THE DRAWINGS

Other objects and advantages of the invention will become apparent from the following description of embodiments with reference to the accompanying drawings in which:

FIGS. 4(1) and 4(2) are views of assistance in explaining the thickness of an anti-glare film adhesion layer and a black coloring layer;

FIGS. 7(1) and 7(2) are views of assistance in explaining the thickness of an anti-glare layer and the black coloring layer, and FIG. 7(3) is an enlarged view of FIG. 7(2);

FIGS. 9(1) and 9(2) are views of assistance in explaining a shape of an adhesion layer of the liquid crystal display device according to the present invention.

DETAILED DESCRIPTION OF THE PREFERRED EMBODIMENTS

Embodiments of the present invention will be explained below with reference to the accompanying drawings.

A transparent organic medium according to the present invention is prescribed as a resin sheet, or a resin which is a liquid when a precursor of the transparent organic medium drops onto the liquid crystal panel and solidified by an external stimulus such as light, heat, humidity, or the like after the protection plate comes in contact with the liquid crystal panel through the transparent organic medium. Specifically, usable transparent organic media include methyl methacrylate, ethyl methacrylate, propyl methacrylate, isopropyl methacrylate, butyl methacrylate, isobutyl methacrylate, hexyl methacrylate, octyl methacrylate, 2-ethyl hexyl methacrylate, decyl methacrylate, dodecyl methacrylate, methyl acrylate, ethyl acrylate, propyl acrylate, isopropyl acrylate, butyl acrylate, isobutyl acrylate, hexyl acrylate, octyl acrylate, 2-ethyl hexyl acrylate, decyl acrylate, dodecyl acrylate, etc., each containing an additive hardening agent which promotes hardening by light, heat, or the like. A transparent organic medium layer is formed using one or a plurality of these organic media. Further, it is possible to form a transparent organic medium layer also through copolymerization of these organic media with another prepolymer or monomer. Usable prepolymers include poly acrylic acid, poly vinyl alcohol, poly allylamine, and the like. Further, usable monomers include ethylene glycol, propylene glycol, diethylene glycol, 1,3-dihydroxy cyclobutane, 1,4-dihydroxy cyclohexane, 1,5-dihydroxy cyclooctane, and the like, each having a hydroxyl group in a molecule. Usable monomers also include ethylene glycol monoglycidyl ether, ethylene glycol diglycidyl ether, and the like, each having a glycidyl group at the end.

Overview

Figure 1:
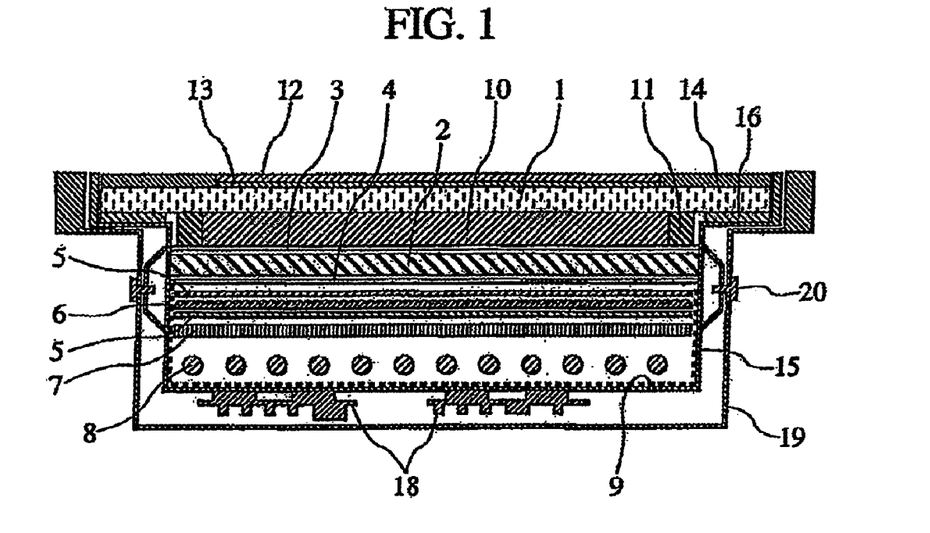
FIG. 1 is a sectional schematic view showing an embodiment of a liquid crystal display device according to the present invention.

The following describes the overview of a liquid crystal display device according to the present invention with reference to FIG. 1.

A liquid crystal panel 2 includes: a pair of transparent substrates (a panel glass on the front side and the same on the back side); a liquid crystal layer sandwiched and held between the pair of substrates; an electrode structure (pixel electrode, common electrode, etc.) for applying electric field to the liquid crystal layer; various types of insulating films; an oriented layer; and a color filter which produces a color in response to the luminance of the liquid crystal layer in a pixel. The front and back panel glasses are provided with a pair of front and back polarizing plates 3 and 4. The front polarizing plate 3 is polarizing a plate close to a protection plate. The back polarizing plate 4 is a polarizing plate close to the backlight. The pair of front and back polarizing plates 3 and 4 transmit only one-directional light and are disposed to sandwich the liquid crystal panel 2.

If the front side of the liquid crystal panel is used as an image display plane, optical components such as the back polarizing plate 4, diffusing sheets 5, a prism sheet 6, and a diffusing plate 7 are disposed on the backlight side having light sources such as cold cathode fluorescent lamps 8 which irradiate the liquid crystal panel 2 with light, i.e., between the liquid crystal panel 2 and the cold cathode fluorescent lamps 8. Although two diffusing sheets 5 are shown in FIG. 1, only one sheet may be used. Further, although the cold cathode fluorescent lamps 8 are used as light sources in FIG. 1, light emitting diodes (LEDs) or the like as light sources may be used. Further, although a number of light sources are arranged on the back of the liquid crystal panel, light sources may be provided at both ends or only one end so that the entire panel is irradiated with light through a light guide plate. The light emitted from the light sources is efficiently applied toward the liquid crystal panel 2 through a reflective sheet 9. The reflective sheet 9 is disposed for the light sources such as the cold cathode fluorescent lamps 8 at a side opposite to the side on which the liquid crystal panel 2 is disposed. The reflective sheet 9 is composed of a resin sheet containing a white material such as magnesium oxide, or a sheet having a coating film containing a white material.

The front polarizing plate 3 and a transparent organic medium layer 10 are disposed on the front side of the liquid crystal panel 2 (the side opposite to the side on which the cold cathode fluorescent lamp 8 is disposed). Further, the transparent organic medium layer is formed and disposed on the side of one of the pair of polarizing plates, which side is opposite to the side on which the liquid crystal panel is disposed.

Referring to FIG. 1, a frame 11 is provided at the ends of the transparent organic medium layer 10, i.e., around the transparent organic medium layer 10. The ends (four sides) of the liquid crystal panel 2 are not used to display an image (non-image display region, not shown). Therefore, it is preferable to provide the frame 11 in the non-image display region of the liquid crystal panel 2 so that, when an image is displayed, the frame 11 does not disturb the visibility of the image. Further, if the frame 11 is made transparent and colorless or black, it can be seen similarly to the color of the polarizing plate (almost black) and accordingly the frame desirably becomes indistinctive.

Meanwhile, when a material having high elastic modulus is used as a component material of the transparent organic medium layer 10, the buffering action against impact can be improved. The elastic modulus of the transparent organic medium layer is a hardness ranging from 5 to 30 is preferable when measured with a type A durometer based on JIS K 6253, a rubber hardness measurement standard. Further, hardness between 10 and 30 is more preferable. In the case of hardness less than 5, if a liquid crystal display device including the protection plate 1 is left under high temperature (50 to 70° C.) for a prolonged period of time, the protection plate 1 may slightly shift. Further, with a hardness exceeding 30, there is a tendency that the buffering effect against impact may be degraded.

The frame 11 is necessary when the transparent organic medium layer 10 is produced using a liquid precursor of a transparent organic medium, but not necessary when the transparent organic medium layer 10 is a resin sheet.

The protection plate 1 is attached to the surface of the transparent organic medium layer 10 (a side opposite to the side on which the liquid crystal panel 2 is disposed, with respect to the transparent organic medium layer 10). The protection plate 1 is composed of glass or visually transparent resin (acrylic resin, polycarbonate resin, polyethylene terephthalate resin, cycloolefin resin, etc.) which hardly absorbs light in the visible region. The thinner the protection plate 1, the lighter can the liquid crystal display device be made; however, there is a tendency that the thicker protection plate 1 provides the resistance to shock of the image display plane. Further, the use of higher hardness glass is not subject to flaw when dust is wiped off. However, the specific gravity of glass is about twice that of resin. Therefore, when comparison is made with the protection plates 1 having the same thickness, glass is more likely to increase the weight of the liquid crystal display device than resin.

An anti-glare film (an adhesion layer 13 of an anti-glare layer 12 and an anti-glare film) and a black coloring layer 14 are formed on the surface of the protection plate 1 (a side opposite to the side on which the transparent organic medium layer 10 is disposed with respect to the side of the protection plate 1). The anti-glare layer 12 is attached to the protection plate 1 through the adhesion layer 13.

Further, the black coloring layer 14 is formed at a portion associated with the non-image display region at the ends of four sides on the protection plate 1.

Further, although an anti-glare film is provided on the surface of the protection plate 1, an antireflection film may be provided instead of the anti-glare film. Specifically, similarly to the anti-glare film, an antireflection film may be provided at a side opposite to the side on which the transparent organic medium layer 10 is disposed with respect to the protection plate 1. Further, the antireflection film includes a film base material, an adhesion layer, and an antireflection film; and triacetyl cellulose having a small subrefraction is preferable as a film base material.

The black coloring layer 14 is formed of a film having black dye contained in a resin, or a film composed of a black inorganic substance.

Figure 2:
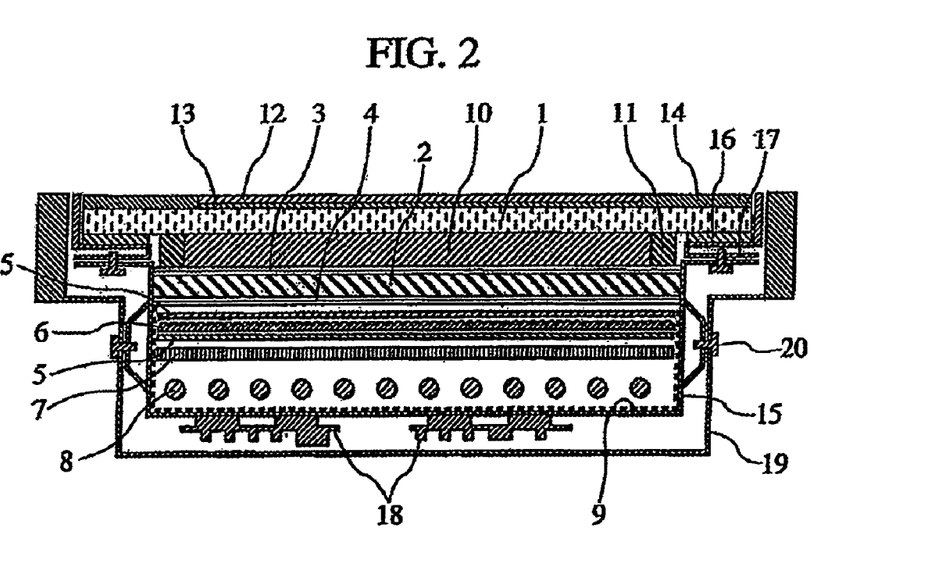
FIG. 2 is a sectional schematic view showing another embodiment of the liquid crystal display device according to the present invention.

A liquid crystal module housing 15 accommodates the liquid crystal panel 2 in which the protection plate 1 is attached, the light sources, and the optical components. The liquid crystal panel 2 is fixed through the adhesion layer 16 between the protection plate 1 and the liquid crystal module housing 15 as shown in FIG. 1; its fixing method is not limited. It is only necessary to use fixable members or fixing members (junction members), and as shown in FIG. 2, the liquid crystal panel 2 may be fixed by stoppers 17 of the liquid crystal module.

Although substrates 18 including a power supply, a tuner, an amplifier, etc. are mounted to the liquid crystal module housing 15 as shown in FIG. 1, they may be mounted to a housing 19 of the liquid crystal display device. Although the liquid crystal module is fixed to the liquid crystal display device with the stoppers 20 for the liquid crystal module housing 15 and the housing 19 of the liquid crystal display device as shown in FIG. 1, its fixing method is not limited and the liquid crystal module may be fixed by adhesion.

First Embodiment

A first embodiment will be explained below with reference to FIG. 1. With a liquid crystal display device according to the present invention, the black coloring layer 14 is formed at the ends of four sides on the surface of the protection plate 1 so that the adhesion layer 16 and the frame 11 can be hidden, enabling only an image to be displayed on the surface of the protection plate. The present embodiment allows the black coloring layer 14 and the anti-glare film to be disposed in the same plane without level difference on the surface.

Further, an anti-glare layer 12 is formed above the protection plate 1 to restrain reflection of surrounding scenery to the protection plate 1, thereby improving the visibility. With the present embodiment, the anti-glare layer 12 is formed above the protection plate 1 through the adhesion layer 13. To attain the thick black coloring layer 14 while reflection of surrounding scenery to the display region is restrained, the anti-glare film 12 is attached only to the portion where the black coloring layer 14 is not formed above the surface of the protection plate 1 as shown in FIG. 1.

When the anti-glare film is attached as shown in FIG. 1, the protection plate 1 becomes flat and accordingly the image display plane becomes flat as a liquid crystal module. Further, as shown in FIG. 1, the front surface of the housing 19 of the liquid crystal display device is aligned with the surface of the anti-glare layer 12 of the image display plane. This contributes to improvement of the flatness of the front surface including the image display plane of the liquid crystal display device.

It should be noted that although FIG. 1 shows a constitution in which an anti-glare film is attached to the protection plate 1, the same effect as above can be obtained also even if an antireflection film is attached instead of the anti-glare film.

Second Embodiment

A second embodiment will be explained below with reference to FIG. 3.

Like the first embodiment, the black coloring layer 14 is formed on the protection plate 1 so that the adhesion layer 16 and the frame 11 can be hidden, thereby making it possible to display only an image on the surface of the protection plate 1.

Further, the anti-glare film (the adhesion layer 13 and the anti-glare layer 12) is formed above the surface of the protection plate 1 including the black coloring layer 14. That is, the anti-glare layer and the adhesion layer are formed above the black coloring layer and the protection plate. The effects obtained by such a constitution are that joint seams on the surface of the protection plate 1 are eliminated, making it easier to wipe off dust on the anti-glare layer 12 using a dustcloth dampened with water or the like. Further, since the anti-glare film is provided on the black coloring layer 14, an effect of preventing exfoliation of the black coloring layer 14 is obtained even if wiping is repeated.

Figure 3:
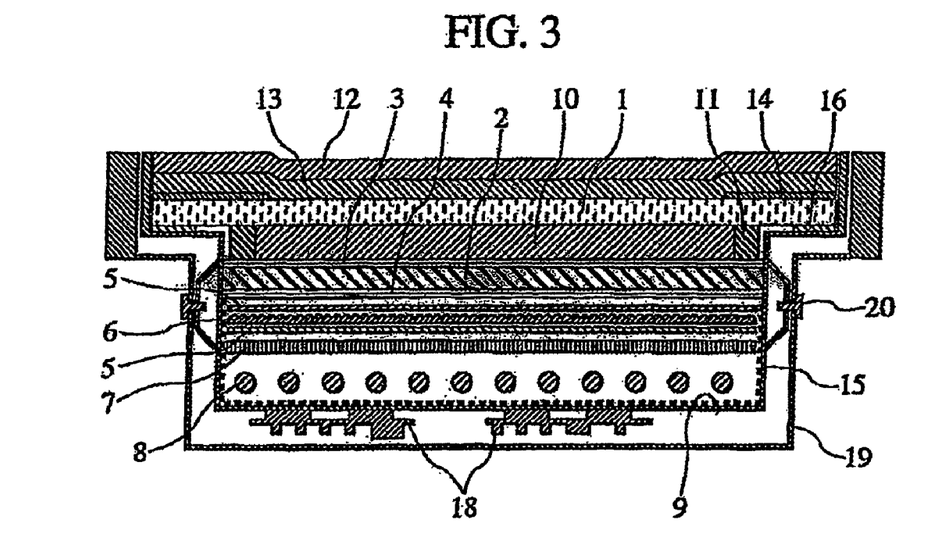
FIG. 3 is a sectional schematic view showing still another embodiment of the liquid crystal display device according to the present invention.
Figure 4:
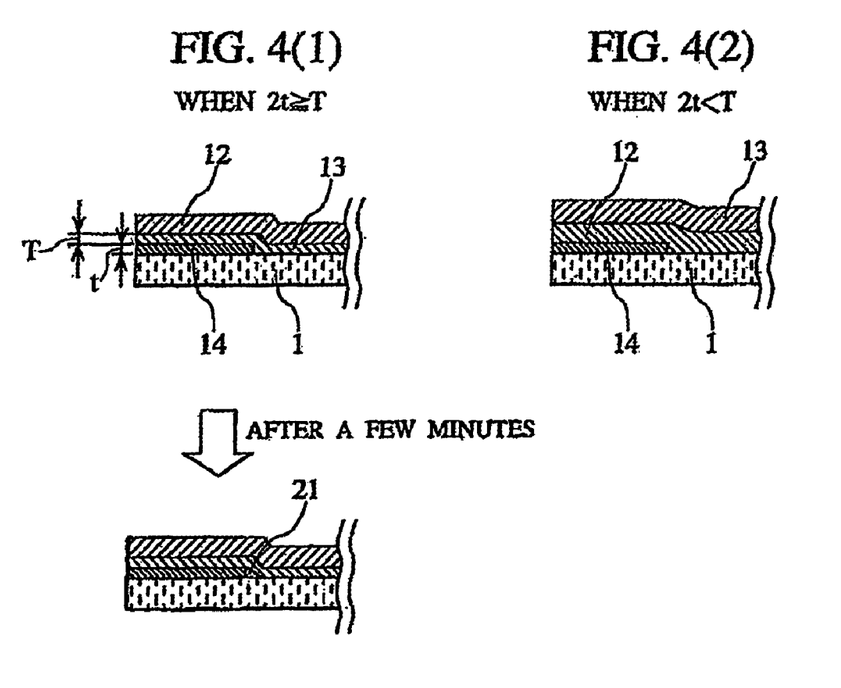

It should be noted that although FIG. 3 shows a constitution in which an anti-glare film is attached to the protection plate, the same effect as above can be obtained also even if an antireflection film is attached instead of the anti-glare film.

Third Embodiment

A third embodiment will be explained below with reference to FIG. 4.

If the adhesion layer 13 of the anti-glare film is thin, air bubbles 21 may be generated in the vicinity of the end of the black coloring layer 14 when a certain period of time has elapsed after the anti-glare film is attached to the protection plate 1. Since these air bubbles are generated in the image display region, there arises a problem of degraded visibility of image, as shown in FIG. 4(1).

As a result of our study, it turns out that the thinner the adhesion layer 13 of the anti-glare film and the thicker the black coloring layer, the easier becomes air bubbles 21 to be generated. Further, when T denotes the thickness of the adhesion layer 13 of the anti-glare film; and t, the thickness of the black coloring layer, it turns out that the generation of air bubbles 21 can be restrained when a relation 2t<T is satisfied as mentioned later. Therefore, based on a constitution as shown in FIG. 4(2), which satisfies a relation 2t<T, it becomes possible to restrain the generation of air bubbles 21 in the vicinity of the end of the black coloring layer 14.

The adhesion layer 13 of the anti-glare film has high flexibility; therefore, if the adhesion layer is attached to a surface having a level difference, it is deformed following the level difference. However, if the level difference becomes larger than the adhesion layer, it becomes impossible to follow the level difference resulting in generation of air bubbles. If the thickness of the adhesion layer 13 of the anti-glare film is increased so as to follow the black coloring layer 14 which is a level difference of the surface of the protection plate 1, air bubbles 21 are not generated as a result.

Table 1 shows whether or not air bubbles 21 are generated when the thickness of the black coloring layer and the thickness of the adhesion layer 13 of the anti-glare film are changed.

TABLE 1

Generation of air bubbles at the end of the black coloring layer when the thickness of the black coloring layer and the thickness of the adhesion layer of the anti-glare film are changed

| Thickness of black coloring layer (µm) | Thickness of adhesion layer of anti-glare film (µm) | Generation of air bubbles |
| --- | --- | --- |
| 4 | 5 | generated |
| 4 | 8 | generated |
| 4 | 9 | none |
| 4 | 11 | none |
| 4 | 13 | none |
| 5 | 5 | generated |
| 5 | 8 | generated |
| 5 | 9 | generated |
| 5 | 11 | none |
| 5 | 13 | none |
| 9 | 8 | generated |
| 9 | 11 | generated |
| 9 | 18 | generated |
| 9 | 20 | none |
| 9 | 25 | none |
| 17 | 18 | generated |
| 17 | 25 | generated |
| 17 | 30 | generated |
| 17 | 35 | none |
| 17 | 40 | none |

It turns out from the above results that, in order that the air bubbles 21 is not generated, a relation 2t<T needs to be satisfied, where T denotes the thickness of the adhesion layer 13 of the anti-glare film; and t, the thickness of the black coloring layer 14.

It should be noted that although FIG. 3 shows a constitution in which an anti-glare film is attached to the protection plate 1, the same effect as above can be obtained also even if an antireflection film is attached instead of the anti-glare film.

Fourth Embodiment

Figure 5:
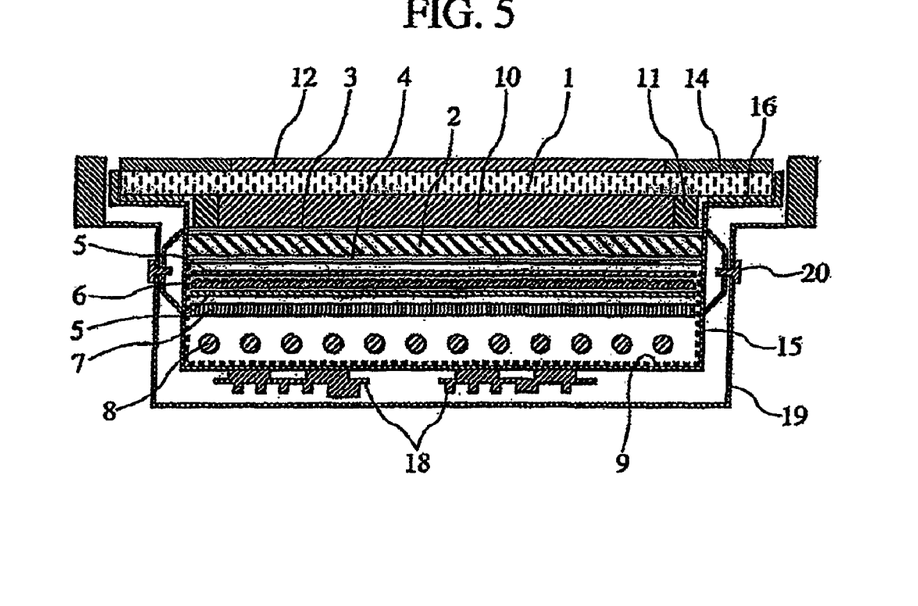
FIG. 5 is a sectional schematic view showing still another embodiment of the liquid crystal display device according to the present invention.

A fourth embodiment will be explained below with reference to FIG. 5.

Like the first embodiment, the black coloring layer 14 is formed on the protection plate 1 so that the adhesion layer 16 and the frame 11 can be hidden, thereby making it possible to display only an image on the surface of the protection plate 1.

Further, the anti-glare layer 12 is directly formed on the surface of the protection plate 1 other than the black coloring layer 14 such that the surface of the protection plate 1 becomes flat and accordingly the image display plane becomes flat as a liquid crystal module. Further, as shown in FIG. 5, the front surface of the housing 19 of the liquid crystal display device is aligned with the surface of the anti-glare layer 12 of the image display plane. This contributes to improvement of the flatness of the front surface including the image display plane of the liquid crystal display device.

When the anti-glare layer 12 is directly formed on the protection film instead of the anti-glare film, a film base material (typically, a film base material made from PET) and the adhesion layer become no longer necessary. Further, in the case of a film, it is necessary to remove a model film (attached to the adhesion layer) before the film is attached to the protection plate 1. Therefore, the removed model film is to be wasted; however a film base material and an adhesion layer are required. Direct formation of the anti-glare layer 12 on the protection plate 1 provides an effect of reducing such members and wastes.

When the anti-glare layer 12 is formed, it is preferably formed through coating from the viewpoint of mass production. Particles are added in a paint to be used or the anti-glare layer 12 is formed with irregularities on the surface thereof by use of a roll having irregularities at the time of coating so that it is possible to improve haze and give anti-glare characteristics. However, since an image blurs if the haze is too high, it is necessary to control the particle size, the additive rate, surface irregularities, and frequency per unit area to adjust the haze to a suitable magnitude. There is a tendency that when the size of the particle to be added is larger and the additive rate is higher, the haze becomes higher. The larger irregularities on the surface and the higher frequency of irregularities per unit area tend to make the haze higher.

Fifth Embodiment

Figure 6:
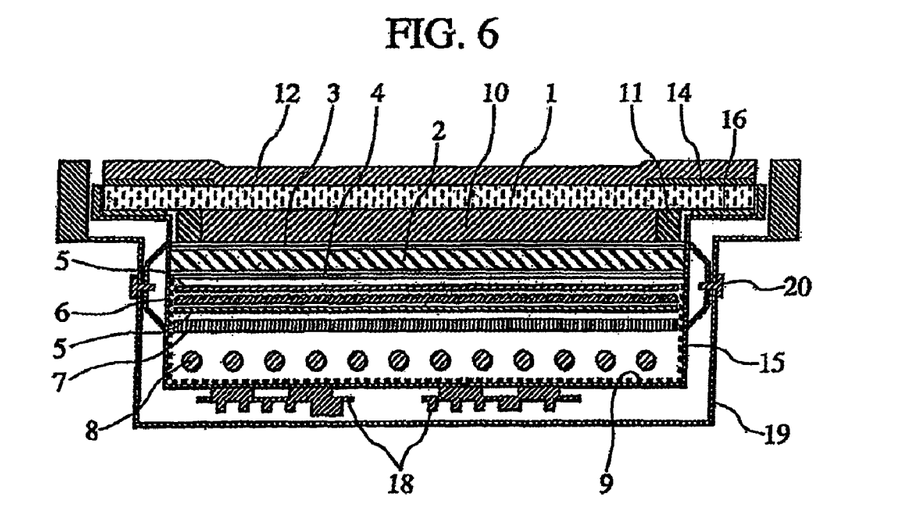
FIG. 6 is a sectional schematic view showing still another embodiment of the liquid crystal display device according to the present invention.
Figure 7:
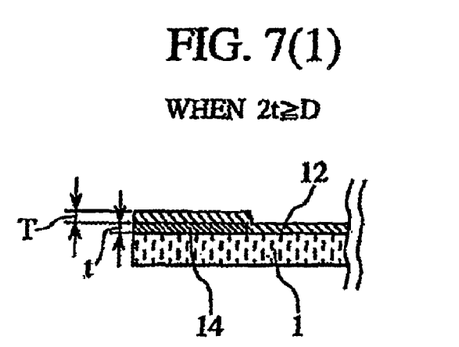

A fifth embodiment will be explained below with reference to FIG. 6. The anti-glare layer 12 is formed on the surface of the protection plate 1 including the black coloring layer 14 such that joint seams on the surface of the protection plate 1 are eliminated, making it easier to wipe off dust on the anti-glare layer 12 using a dustcloth dampened with water or the like.

Sixth Embodiment

A sixth embodiment will be explained below with reference to FIG. 7.

If the anti-glare layer 12 is thin, the end of the black coloring layer 14 will be significantly raised from the surface of the protection plate 1. Therefore, when dust on the display region is wiped off using a dustcloth or the like, the close may be caught damaging the anti-glare layer 12, as shown in FIG. 7(1).

As a result of our study, it turns out that the thinner the anti-glare layer 12 and the thicker the black coloring layer 14, the more remarkable becomes the above-mentioned problem. Further, if a relation 2t<D is satisfied, where D denotes the thickness of the anti-glare layer 12; and t, the thickness of the black coloring layer 14, the anti-glare layer 12 on the black coloring layer 14 gently rises as shown in FIG. 7(2). FIG. 7(3) is an enlarged view of FIG. 7(2). Therefore it is possible to wipe off the display region using a dustcloth or the like without feeling a resistance of being caught.

Table 2 shows values of L and L/t of FIG. 7 when the thickness of the black coloring layer 14 and the thickness of the anti-glare layer 12 are changed.

TABLE 2

Values of L and L/t when the thickness of the black coloring layer, t, and the thickness of anti-glare layer are changed

| Thickness of black coloring layer (μm) | Thickness of anti-glare layer (μm) | L (μm) | L/t |
|---|---|---|---|
| 4 | 5 | 5 | 1.25 |
| 4 | 8 | 10 | 2.50 |
| 4 | 9 | 16 | 4.00 |
| 4 | 11 | 24 | 6.00 |
| 9 | 8 | 6 | 0.67 |
| 9 | 11 | 9 | 1.00 |
| 9 | 18 | 22 | 2.44 |
| 9 | 20 | 36 | 4.00 |
| 9 | 25 | 54 | 6.00 |

Symbol L denotes the length of a portion where the anti-glare layer 12 is obliquely formed due to the thickness of the black coloring layer 14. As a result, when a relation 2t<D is satisfied, the value of L/t remarkably increases with a slight increase in the thickness of the anti-glare layer 12. Specifically, the value of L/t becomes 4 or more. A large value of L/t means that the slope (level difference) remarkably becomes gentle. The susceptibility test was performed with 10 sample individuals to investigate whether or not an individual feels a resistance of being caught when wiping off dust on the slope portion using a dustcloth. When L/t was 2.5 or less, 9 individuals out of 10 felt a resistance of being caught when wiping off dust using a dustcloth or the like. However, when L/t was 4 or larger, 9 individuals out of 10 did not feel a resistance of being caught when wiping off dust using a dustcloth or the like. As mentioned above, when a relation 2t<D is satisfied, where D denotes the thickness of the anti-glare layer 12; t, the thickness of the black coloring layer 14, it turns out that none of the individuals feels a resistance of being caught when wiping off dust in the display region using a dustcloth or the like. In addition, the same test result as above is obtained when the antireflection film which is an antireflection layer is attached instead of the anti-glare film.

Seventh Embodiment

Figure 8:
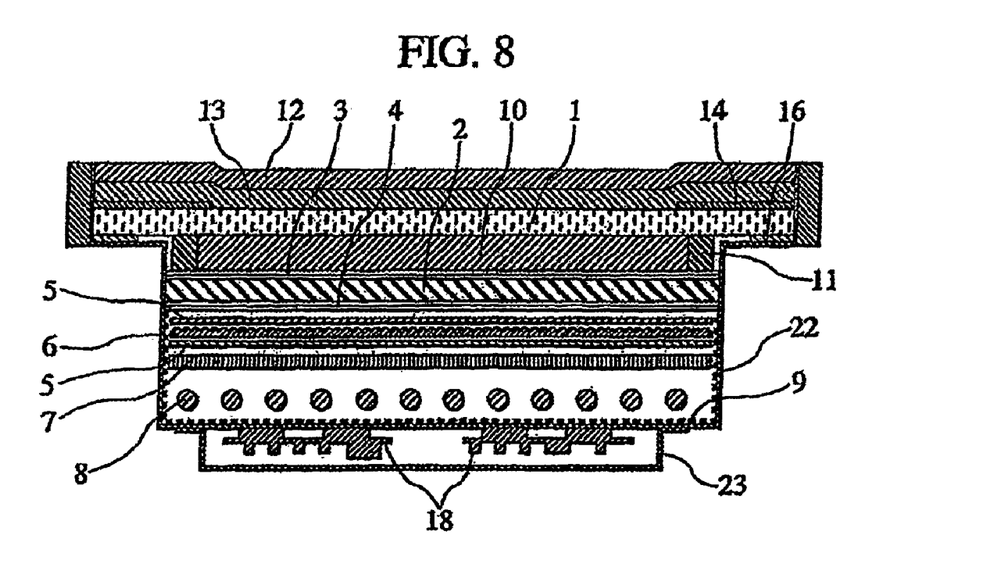
FIG. 8 is a sectional schematic view showing still another embodiment of the liquid crystal display device according to the present invention.
Figure 9:
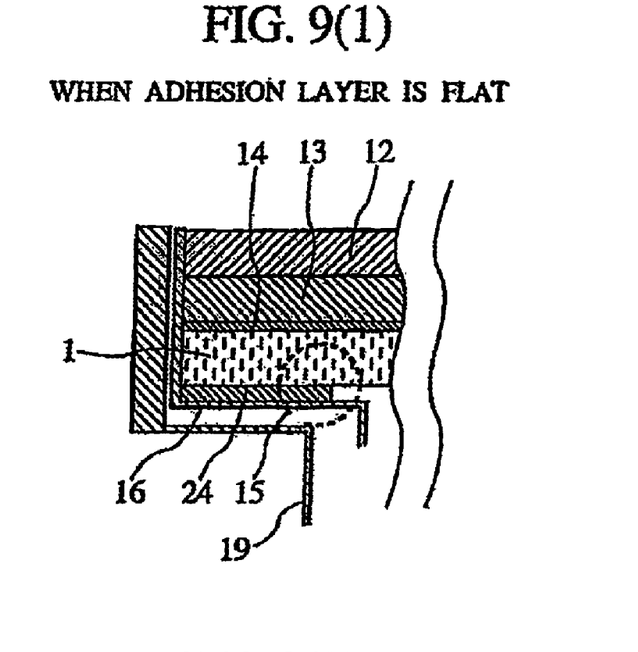

A seventh embodiment will be explained below with reference to FIG. 8.

The use of a housing 22 of the liquid crystal module and liquid crystal display device makes it possible to integrate the housing of the liquid crystal module and the housing of the liquid crystal display device into one. This reduces the necessary quantity of member and component materials (metals such as iron and SUS or FRP), resulting in reduction of the weight of the device. A rear cover 23 is provided to prevent electric shock from being caused by exposure of the substrate 18 including a power supply, a tuner, an amplifier, etc. The housings of the liquid crystal module and the liquid crystal display device need have considerable rigidity to withstand a remarkable load. The rear cover 23 has only to have rigidity to such an extent as to withstand its weight. When the above factors are totally taken into consideration, it is more preferable to integrate the housing of the liquid crystal module and the housing of the liquid crystal display device into one. This is because the necessary quantity of members and component materials are reduced, leading to reduction in the weight of the device.

Although the protection plate 1, the anti-glare layer 12, etc. are the same as those of the second embodiment, other embodiments are applicable.

Eighth Embodiment

An eighth embodiment will be explained below with reference to FIG. 9.

As shown in FIG. 9(1), an adhesion portion through which the liquid crystal module housing 15 is attached to the protection plate 1 (flat adhesion portion) is formed to be uniform. In such a case, if an object collides with the protection plate 1, the impact is concentrated on a portion 24 which is present at the ends of the adhesion layer 16 but is closer to the central portion of the protection plate 1. If a strong impact is applied to the protection plate 1, the protection plate 1 may be broken at a portion in the vicinity of the portion 24. However, as shown in FIG. 9(2), the thickness of the adhesion layer 16 is increased at a portion where impact is concentrated, i.e., the thickness of fixing members such as the adhesion layer 16 is made thicker at a portion closer to the central portion of the protection plate 1 than at the ends thereof. As a result, since the impact is applied to the entire adhesion portion of the protection plate 1, the protection plate 1 is not subject to breakage as compared with the structure shown in FIG. 9(1).

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A liquid crystal device comprising:
    a liquid crystal panel which includes a liquid crystal layer sandwiched and held between a pair of substrates;
    a pair of polarizing plates disposed to sandwich and hold the liquid crystal panel;
    a transparent organic medium layer formed on a side of one of the pair of polarizing plates, the side being opposite to a side at which the liquid crystal panel is disposed;
    a protection plate formed on a side of the transparent organic medium layer, the side being opposite to a side at which the liquid crystal panel is disposed;
    a black coloring layer formed on a side of the protection plate but in a non-image display region, the side being opposite to a side at which the transparent organic medium layer is disposed;
    an anti-glare layer formed on a side of the protection plate, the side being opposite to a side at which the transparent organic medium layer is disposed;
    wherein the anti-glare layer is attached to the protection late through an adhesion layer;
    wherein the anti-glare layer and the adhesion layer are formed above the black coloring layer and the protection plate; and
    wherein a relation 2t<T is satisfied, where t denotes the thickness of the black coloring layer; and T, the thickness of the adhesion layer.

2. The liquid crystal display device according to claim 1, wherein:
    the black coloring layer is formed at ends of four sides on the protection plate.

3. A liquid crystal display device according to claim 1, further comprising:
    a housing;
    fixing members which fix the housing and the protection plate; and
    a frame formed so as to surround the transparent organic medium layer.

4. The liquid crystal display device according to claim 1, further comprising:
    an antireflection layer formed on a side of the protection plate, the side being opposite to a side at which the transparent organic medium layer is disposed.

5. The liquid crystal display device according to claim 1, wherein:
    the black coloring layer and the anti-glare layer are disposed in the same plane.

6. The liquid crystal display device according to claim 1, wherein:
    the anti-glare layer is formed directly on the protection plate and the black coloring layer.

7. The liquid crystal display device according to claim 6, wherein:
    a relation 2t<D is satisfied, where t denotes the thickness of the black coloring layer; and D, the thickness of the anti-glare layer.

8. The liquid crystal display device according to claim 3, wherein:
    the thickness of the fixing members is thicker at a portion close to the central portion of the protection plate than at the end thereof.

9. A liquid crystal display device according to claim 1, wherein:
    the thickness of the black coloring layer is more than 4 μm and less than 17 μm.

10. A liquid crystal display device according to claim 1, wherein:
    the thickness of the adhesion layer is more than 4 μm and less than 40 μm.

11. A liquid crystal display device according to claim 7, wherein:
    the thickness of the anti-glare layer is more than 9 μm and less than 25 μm.

12. A liquid crystal display device comprising:
    a liquid crystal panel which includes a liquid crystal layer sandwiched and held between a pair of substrates;
    a pair of polarizing plates disposed to sandwich and hold the liquid crystal panel;
    a transparent organic medium layer formed on a side of one of the pair of polarizing plates, the side being opposite to a side on which the liquid crystal panel is disposed;
    a protection plate formed on a side of the transparent organic medium layer, the side being opposite to a side on which the liquid crystal panel is disposed; and
    a black coloring layer formed on a side of the protection plate but in a non-image display region, the side being opposite to a side on which the transparent organic medium layer is disposed;
    a backlight which includes light sources disposed for the liquid crystal panel at a side opposite to the side at which the protection plate is disposed, the light sources irradiating the liquid crystal panel with light; and
    an anti-glare layer or an antireflection layer formed on a side of the protection plate, the side being opposite to a side at which the transparent organic medium layer is disposed;
    wherein the anti-glare layer or the antireflective layer is attached to the protection plate through an adhesion layer; and
    wherein a relation 2t<T is satisfied, where t denotes the thickness of the black coloring layer; and T, the thickness of the adhesion layer.

13. The liquid crystal display device according to claim 12, wherein:
    the backlight includes a reflective sheet disposed for the light sources for reflecting light to a side opposite to the side on which the liquid crystal panel is disposed.

14. The liquid crystal display device according to claim 12, wherein:
    the black coloring layer is formed at ends of four sides on the protection plate.

15. The liquid crystal display device according to claim 12, further comprising:
    a housing;
    fixing members which fix the housing and the protection plate through adhesion; and
    a frame formed so as to surround the transparent organic medium layer.

16. The liquid crystal display device according to claim 12, wherein:
    a relation 2t<D is satisfied, where t denotes the thickness of the black coloring layer; and D, the thickness of the anti-glare layer or the antireflection layer.

* * * * *